July 6, 1965  P. J. TAMMINEN  3,193,413
METHOD FOR ACTIVATING AND ISOLATING A GALVANIC BATTERY
AND GALVANIC BATTERY PRODUCED
ACCORDING TO SAID METHOD
Filed July 12, 1961
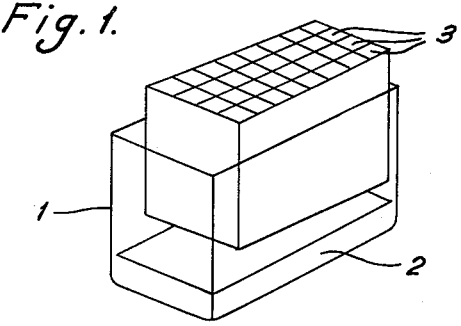
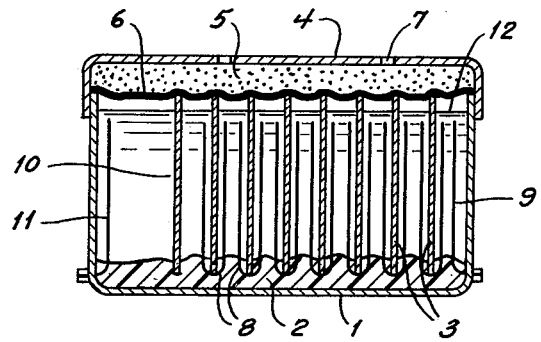
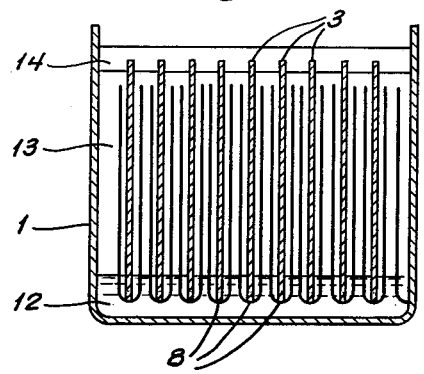
PENTTI J. TAMMINEN
INVENTOR.
BY
ATTORNEY.

United States Patent Office 3,193,413
Patented July 6, 1965

3,193,413
METHOD FOR ACTIVATING AND ISOLATING A GALVANIC BATTERY AND GALVANIC BATTERY PRODUCED ACCORDING TO SAID METHOD
Pentti J. Tamminen, Otakallio, Otaniemi, Finland
Filed July 12, 1961, Ser. No. 123,460
8 Claims. (Cl. 136—90)

This invention refers to a method for activating and isolating galvanic batteries. The invention refers particularly to batteries of such quality which do not stand storage for longer periods in their ready for use state, and which therefore must be activated only immediately before they are taken to use. Usually such batteries comprise several cells, which are activated by filling them one by one with an electrolyte liquor. This is an awkward procedure which requires special instruments, and because of the great activity of some such batteries it is possible that the cells which are activated first, will be somewhat worn when the activation of the battery is finished.

The purpose of the invention is to eliminate these drawbacks by a method according to which all the cells can be activated simultaneously simply and quickly. The invention is characterized mainly in that a frame consisting of oblong compartments which have electrodes of opposite polarity therein, said compartments being open at least at their one end, are dipped first in an activating medium so as to cause the activating medium to penetrate all the compartments simultaneously, and secondly in an isolating medium which also penetrates the compartments, thus isolating them from each other. Once activated and isolated, the compartments may now be considered as and termed "cells".

According to one advantageous embodiment of the invention, the activating medium and the isolating medium are arranged on top of each other in such an order that the activating medium will penetrate the compartments first, and at the finish of the dipping movement the isolating medium will penetrate.

In this case it is advantageous to use a frame forming compartments that are open at one end, and to evacuate the compartments and then dip the open end of the frame, while the frame remains under vacuum, into the activating medium and the isolating medium.

In case the activating is not performed under vacuum, both ends of the compartments have to be open. After the activating, the ends of the compartments which were left open can also be sealed by an isolating medium. For this purpose for instance paraffine oil can be used, a thin layer of which is poured on top of the activating medium filling the cells.

The activating medium can, depending upon the type of the battery, be water (Mg-CuCl-battery) or an electrolyte mixture (Bunsen-battery), and it can even contain solid matter ($MnO_2$-battery). In the last mentioned case it is essential, that the mass is fluid enough to be able to penetrate the compartments during activation. In this case it is advantageous to perform the activating and the isolating as separate steps, using separate vessels for the activating medium and the isolating medium.

A suitable isolating medium for use with the invention is one which is viscous and plastic, which will adhere well to the sides of the compartments, is hydrophobic, and which is inert with respect to the activating medium. By way of example a mixture which contains two parts of paraffine oil and one part of microcrystalline wax may be used.

One form of battery made in accordance with the invention is mainly characterized in that oblong compartments which are open in their both ends, form a frame which is inserted in a container filled with activated medium and having at the bottom thereof a layer of isolating medium extending into the ends of the cells thus isolating them from each other.

After this it is advantageous to seal the container with an isolating layer, by pouring an isolating medium on top of the cells, or with a lid which has a layer of isolating medium inside. In this case there may be placed between the lid and the layer of isolating medium a layer of elastic, porous material, and one or more holes may be provided in the lid. When the lid is pressed upon the frame, the porous layer will partially be pressed inside the cells, in which case the layer of isolating medium on its surface will get thinner, especially at the middle of the cell, thus making it possible for any gases eventually forming in the cell to permeate it easily and find their way out through the porous layer and the holes in the lid.

To secure the isolation it is advantageous in advance to coat the upper and lower ends of the compartments with a thin layer, which is hydrophobic and adheres well to the isolating medium, for instance by dipping them in melted microcrystalline wax.

The invention will in the following be described in more detail with reference to the annexed drawing, which show some embodiments of the invention. FIG. 1 is a perspective view of one embodiment; FIG. 2 presents a sectional view of the same ready for use in activated and isolated state; and FIG. 3 presents a sectional view of another embodiment.

In FIG. 1 reference numeral 1 designates a container, at the bottom of which there is a layer of isolating medium 2, described above. A group of compartments 3 forms a frame, which has almost the same width as the container, but the length of which, because of a reason appearing later is less than that of the container. This frame in which the electrodes are inserted is arranged in the container by means for instance of adhesive tape in such a position, that when the electrolyte is poured into the container to a certain height, it is possible for the same to penetrate all the cells up to the same level according to the principle of communicating vessels. After this the frame is pressed down to the bottom of the container, in which position the isolating medium will penetrate to the lower end of the cells isolating them from each other as can be seen from FIG. 2. In this figure the reference character 12 refers to the surface of the electrolyte in the cells.

The container is now covered with a lid 4 at the inside of which there is an isolating layer 5. This is of a porous material for instance foam plastic, at the surface of which there is an additional thin layer of a hydrophobic isolating medium 6. The lid has one or several holes 7, in order to make it possible for the gases forming in the cells to escape.

The particular battery shown and described is a Bunsen type battery (a primary battery); the electrodes in the shown battery are zinc wires 8, bent in U-shape, one leg of which is covered with an electrically conductive plastic layer containing carbon. The electrodes are fastened to the lower rims of the frame by means for instance of a plastic adhesive. The electrolyte can for instance be a mixture containing 14 parts of 15 percent $H_2SO_4$ and 1 part of $Na_2Cr_2O_7$. Two or more electrodes 9 are so fastened in the container, that their ends pass through the wall of the container thus forming the terminals of the battery.

As mentioned previously the frame 3 is shorter than the container 1. In the space 10 thus provided two electrodes 11 with terminals are arranged. In this way it is possible to get in the same container a battery formed by the frame 3, which battery can be used as an anode battery, as well as an element formed in the space 10, which element can be used as a glow element, when the battery is used in an instrument containing radio valves, as for instance in radiosondes.

FIGURE 3 presents another embodiment of the invention in activated and isolated state. The frame 3 in which the electrodes 8 are fastened, fills the whole of the container 1. The layer 12 at the bottom of the container is a liquid, the specific gravity of which is essentially greater than that of the electrolyte 13, which may be, for instance, ethylene chloride. The layer 14 at the surface of the electrolyte is an isolating liquid, the specific gravity of which is essentially less than that of the electrolyte, for instance paraffine oil. When activating, the electrolyte and the heavier isolating liquid are first poured in the container, then the frame 3 is put there, and lastly the lighter isolating liquid, forming the surface layer 14, is poured in the container. This embodiment is suitable to be used in batteries, which will be in an upright position during use, without being exposed to violent movements.

When activating a battery according to the described method the cells will for a moment be short circuited. To avoid any possible drawbacks due to this, the electrodes may be coated with a thin layer of a protecting material, which will fairly quickly dissolve in the electrolyte, or in which the electrolyte will be absorbed, so that the battery will be activated only after being isolated. For this purpose a protective layer, for instance Celluloid, can be used. In case the zinc electrodes of the battery described above are coated with Celluloid, the activation of the battery can be regulated over a broad range depending on the thickness of the layer.

The invention is not limited to the described and shown embodiments only, but these can be varied in many ways within the scope of the following claims.

What I claim is:

1. A method for activating and isolating galvanic batteries which comprises, providing a frame forming a plurality of oblong compartments having electrodes of opposite polarities therein, with said compartments having at least one of their ends open, dipping said frame in an activating medium to cause simultaneous penetration of said compartments by said medium and, thereafter, dipping said frame simultaneously in a flowable isolating medium inert with respect to the activating medium and causing said isolating medium to penetrate said cells to sufficient extent to isolate each of them from each other.

2. A method as in claim 1 and providing said activating medium and isolating medium in layers lying one on the other and at the completion of the penetration with said activating medium effecting the penetration of the compartments with said isolating medium.

3. A method acording to claim 1 and including evacuating the compartments of said frame and effecting said dipping of said compartments in said activating medium and isolating medium under vacuum.

4. A method according to claim 1 including, said frame being formed of compartments open at both ends and dipping said frame under normal pressure in said activating medium and said isolating medium.

5. A method according to claim 4 and including sealing the ends of the compartments remaining open with isolating medium.

6. A method according to claim 1 and including employing a viscous plastic hydrophobic adhesive material inert with respect to the activating medium as the isolating medium.

7. A method according to claim 1 and including, employing a mixture of paraffin oil and microcrystalline wax as the isolating medium.

8. A method according to claim 4 and including, employing as an isolating medium a liquor which is inert with respect to the activating medium and has a specific gravity essentially greater than that of the activating medium.

References Cited by the Examiner

UNITED STATES PATENTS

| | | | |
|---|---|---|---|
| 1,433,602 | 10/22 | Cellino. | |
| 2,144,574 | 1/39 | MacCallum | 136—127 |
| 2,452,049 | 10/48 | Hauck | 136—113 X |
| 2,502,723 | 4/50 | Harriss | 136—113 |

FOREIGN PATENTS 17,824    1909    Great Britain.

JOHN H. MACK, *Primary Examiner.*

JOHN R. SPECK, MURRAY TILLMAN, *Examiners.*